(12) United States Patent
Otsuka

(10) Patent No.: US 11,966,231 B2
(45) Date of Patent: Apr. 23, 2024

(54) ARTICLE TRANSPORT FACILITY

(71) Applicant: Daifuku Co., Ltd., Osaka (JP)

(72) Inventor: Hiroshi Otsuka, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 328 days.

(21) Appl. No.: 17/401,732

(22) Filed: Aug. 13, 2021

(65) Prior Publication Data
US 2022/0050470 A1 Feb. 17, 2022

(30) Foreign Application Priority Data

Aug. 17, 2020 (JP) .................................. 2020-137365

(51) Int. Cl.
*G05D 1/00* (2006.01)
*B61B 3/02* (2006.01)
*B65G 43/00* (2006.01)

(52) U.S. Cl.
CPC .............. *G05D 1/0223* (2013.01); *B61B 3/02* (2013.01); *B65G 43/00* (2013.01); *B65G 2811/095* (2013.01)

(58) Field of Classification Search
CPC ........ G05D 1/0223; B61B 3/02; B65G 43/00; B65G 2811/095
USPC .......................................................... 701/20
See application file for complete search history.

(56) References Cited

U.S. PATENT DOCUMENTS

2011/0118914 A1* 5/2011 Brooks ................... B61L 27/16
701/19
2013/0317675 A1* 11/2013 Kumazawa .......... G05B 19/416
701/19

FOREIGN PATENT DOCUMENTS

JP 2010282569 A 12/2010
WO 2012111193 A1 8/2012

* cited by examiner

*Primary Examiner* — Hung Q Nguyen
*Assistant Examiner* — Anthony Donald Taylor, Jr.
(74) *Attorney, Agent, or Firm* — The Webb Law Firm

(57) ABSTRACT

In a case of changing the traveling speed of a transport vehicle, in order for the traveling speed of the transport vehicle to reach a target speed at a target position that is on a downstream side in the travel path relative to the current position of the transport vehicle, a control unit generates reference speed commands in accordance with a traveling speed time change pattern according to which the travel acceleration changes in a stepwise manner, generates a moving average command obtained using the moving average of the reference speed commands in a set period, and controls travel operations of a travel unit based on the moving average command.

4 Claims, 3 Drawing Sheets

ARTICLE TRANSPORT FACILITY

CROSS-REFERENCE TO RELATED APPLICATION

This application claims priority to Japanese Patent Application No. 2020-137365 filed Aug. 17, 2020, the disclosure of which is hereby incorporated by reference in its entirety.

BACKGROUND OF THE INVENTION

1. Field of the Invention

The present invention relates to an article transport facility that includes a transport vehicle that travels along a travel path and transports an article, and a control unit that controls travel operations of a travel unit included in the transport vehicle.

2. Description of the Related Art

An example of the above-mentioned article transport facility is disclosed in JP 2010-282569A (Patent Document 1). Hereinafter, the reference numerals shown in parentheses in the description of the related art are the reference numerals used in Patent Document 1. The article transport facility of Patent Document 1 includes a transport vehicle (3) that travels along a track (2) and a travel control unit (59) that controls travel operations of the transport vehicle (3). The travel control unit (59) includes a speed pattern generation unit (62) that generates a speed pattern as shown in FIG. 5 of Patent Document 1, and the travel control unit (59) controls travel operations of the transport vehicle (3) in accordance with the speed pattern.

SUMMARY OF THE INVENTION

Here, when the traveling speed of the transport vehicle is changed, force acting in the traveling direction may act on the transport vehicle and an article transported by the transport vehicle due to the change in the travel acceleration of the transport vehicle, and vibration may occur. For example, at the deceleration start point shown in FIG. 5 of Patent Document 1, the travel acceleration of the transport vehicle is likely to change rapidly, and a relatively large amount of vibration may occur in the transport vehicle and the article transported by the transport vehicle. However, Patent Document 1 does not mention that such vibration should be taken into consideration.

In view of this, there is desire for the realization of a technique capable of reducing the amount of vibration that can occur in the transport vehicle and the article transported by the transport vehicle when the traveling speed of the transport vehicle is changed.

An article transport facility according to an aspect of the present disclosure is an article transport facility that includes: a transport vehicle configured to travel along a travel path and transport an article; and a control unit configured to control a travel operation of a travel unit included in the transport vehicle, wherein in a case of changing a traveling speed of the transport vehicle, in order for the traveling speed of the transport vehicle to reach a target speed at a target position that is on a downstream side in the travel path relative to a current position of the transport vehicle, the control unit generates reference speed commands in accordance with a traveling speed time change pattern according to which travel acceleration changes in a stepwise manner, generates a moving average command obtained using a moving average of the reference speed commands in a set period, and controls the travel operation of the travel unit based on the moving average command.

In this configuration, when the traveling speed of the transport vehicle is changed toward the target speed, travel operations of the travel unit are controlled based on the moving average command obtained using the moving average of the reference speed commands. For this reason, the traveling speed of the transport vehicle can be changed such that the change in the travel acceleration is smoother than in the case where travel operations of the travel unit are controlled simply based on the reference speed command. Accordingly, when the traveling speed of the transport vehicle is changed, it is possible to reduce vibration that can occur in the transport vehicle and the article transported by the transport vehicle.

Note that in order to change the traveling speed of the transport vehicle such that the change in the travel acceleration is smooth, it is also conceivable to derive a traveling speed time change pattern that achieves a smooth change in the travel acceleration by performing calculation that gives consideration to jerk (the rate of change of the travel acceleration). However, with such a method, it can be difficult to respond to a case where the target speed changes. To address this, in the above configuration, it is possible to change the traveling speed of the transport vehicle such that the change of the travel acceleration is smooth while also using a traveling speed time change pattern according to which the travel acceleration changes in a stepwise manner, thus making it possible to also respond to a case where the target speed changes.

Further features and advantages of the article transport facility will become apparent from the following description of embodiments described with reference to the drawings.

DETAILED DESCRIPTION OF PREFERRED EMBODIMENTS

Figure 1:
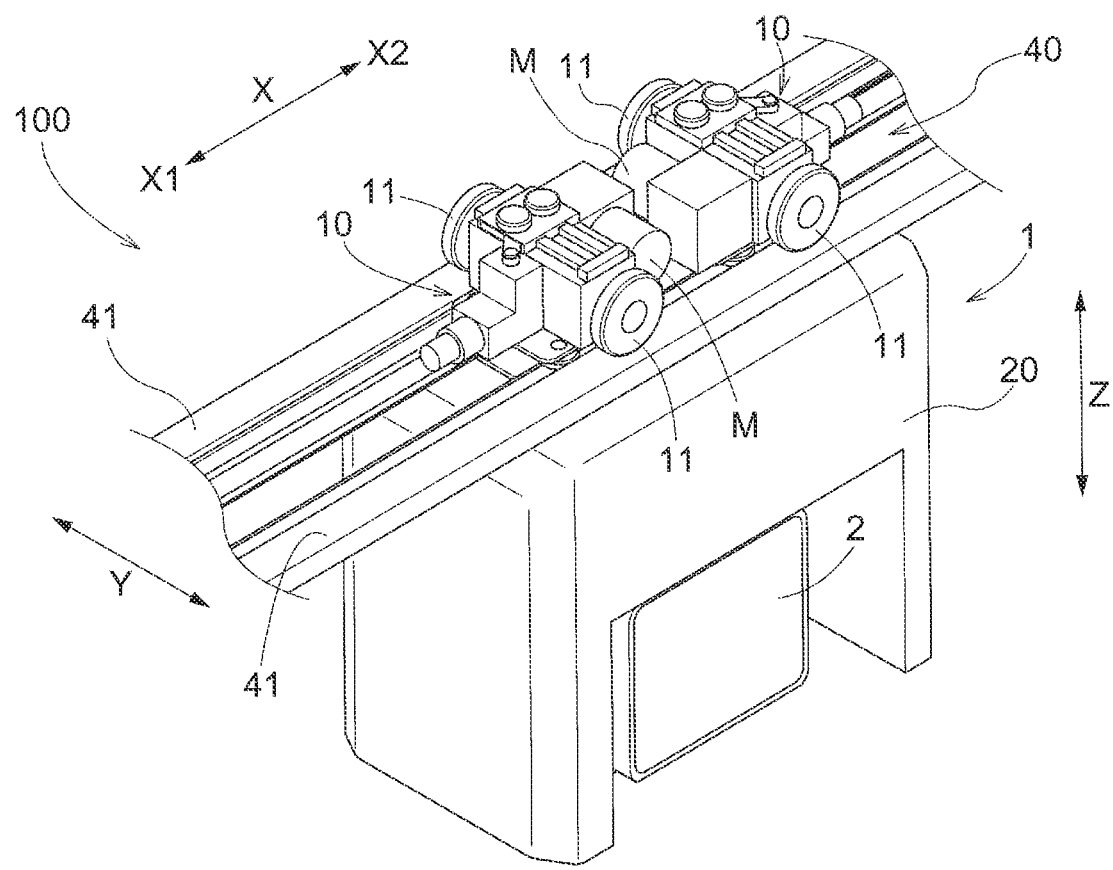
FIG. 1 is a perspective view of a transport vehicle.

An embodiment of an article transport facility will be described below with reference to the drawings. As shown in FIG. 1, an article transport facility 100 includes a transport vehicle 1 that travels along a travel path 40 and transports an article 2. Here, the lengthwise direction of the travel path 40 (the direction in which the travel path 40 extends) will be referred to as a path lengthwise direction X, and the width direction of the travel path 40 will be referred to as a path width direction Y. The path width direction Y is a direction that is orthogonal to both the path lengthwise direction X and a vertical direction Z. The front side in the advancing direction of the transport vehicle 1 in the path lengthwise direction X will be referred to as a downstream side X1, and the rear side in the advancing direction of the transport vehicle 1 in the path lengthwise direction X will be referred to as an upstream side X2.

In the present embodiment, the article transport facility 100 includes travel rails 41 that are arranged along the travel path 40 (here, a pair of travel rails 41 are arranged with a gap therebetween in the path width direction Y), and the transport vehicle 1 travels along the travel rails 41. In the example shown in FIG. 1, the transport vehicle 1 is a ceiling transport vehicle that travels along the travel path 40 that is formed along a ceiling, and the travel rails 41 are suspended from and supported by the ceiling, for example. Note that the transport vehicle 1 may be a transport vehicle other than a ceiling transport vehicle. One example of a transport vehicle other than the ceiling transport vehicle is a transport vehicle that travels along a travel path formed along the floor. The travel path in this case may be formed by a travel rail or may be set virtually. Although there are no limitations on the type of the article 2, the article 2 here is a FOUP (Front Opening Unified Pod) for accommodating a semiconductor wafer, for example.

As shown in FIG. 1, the transport vehicle 1 includes travel units 10. The travel units 10 travel along the travel rails 41 (here, the pair of travel rails 41). The travel units 10 each include wheels 11 that roll on the traveling surfaces of the travel rails 41, and a drive unit M (e.g., an electric motor such as a servomotor) that rotates the wheels 11. The wheels 11 are rotationally driven by the drive units M, and thus the travel units 10 travel along the travel rails 41. Although this will not be described in detail, the travel units 10 are provided with guide wheels that roll on guide surfaces of the travel rails 41, and the travel units 10 travel along the travel rails 41 in a state where the guide wheels are in contact with the guide surfaces of the travel rails 41. In the example shown in FIG. 1, the transport vehicle 1 is provided with a pair of travel units 10 that are side-by-side in the path lengthwise direction X.

As shown in FIG. 1, the transport vehicle 1 includes a main body portion 20 that is connected to the travel units 10. In the example shown in FIG. 1, the main body portion 20 is supported by the travel units 10 in a state of being arranged below the travel units 10 in the vertical direction Z. Although this will not be described in detail, the main body portion 20 includes a support portion for supporting the article 2, and the article 2 is conveyed by the transport vehicle 1 in a state of being supported by the main body portion 20.

Figure 2:
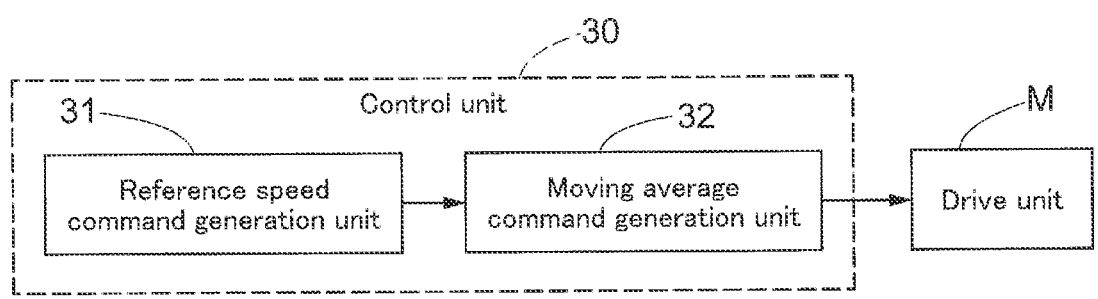
FIG. 2 is a control block diagram.

As shown in FIG. 2, the article transport facility 100 includes a control unit 30. The control unit 30 includes an arithmetic processing unit such as a CPU and peripheral circuits such as a memory, and the functions of the control unit 30 are realized by cooperation between such hardware and a program executed on a piece of hardware such as the arithmetic processing unit. The control unit 30 may be provided in the transport vehicle 1 or may be provided independently of the transport vehicle 1. Also, if the control unit 30 includes a plurality of pieces of hardware that are arranged separately and able to communicate with each other, it is possible for some of the pieces of hardware to be provided in the transport vehicle 1 and the remaining pieces of hardware to be provided independently of the transport vehicle 1. The technical features of the control unit 30 disclosed in the present specification can also be applied to a method of controlling the transport vehicle 1 of the article transport facility 100, and the method of controlling the transport vehicle 1 is also disclosed in the present specification.

The control unit 30 controls travel operations of the travel units 10. Specifically, the control unit 30 controls travel operations of the travel units 10 by controlling the driving of the drive units M. Hereinafter, the control of the travel units 10 (the control of travel operations) by the control unit 30 of the present embodiment will be described, and as described above, in the example shown in FIG. 1, the transport vehicle 1 includes two travel units 10 that are side-by-side in the path lengthwise direction X. In this case, the two travel units 10 are controlled in a similar manner, or a configuration is possible in which a first travel unit, which is one of the travel units 10, is controlled as described below, and a second travel unit, which is the other one of the travel units 10, is controlled so as to follow the traveling of the first travel unit. In the latter case, the control unit 30 controls the drive torque of the wheels 11 applied by the drive unit M of the second travel unit such that the second travel unit travels in accordance with the traveling of the first travel unit, for example. The control unit 30 may cause the second travel unit to travel in accordance with the traveling of the first travel unit by performing control such that the drive torque of the wheels 11 applied by the drive unit M of the second travel unit is zero (torque-free control).

For example, if the transport vehicle 1 is to be stopped at a stop position that corresponds to a transport source or a transport destination of the article 2, or if control is to be performed to maintain an inter-vehicle distance from another transport vehicle 1 that is located on the downstream side X1 on the travel path 40, or if deceleration is to be performed when the transport vehicle 1 moves from a straight section that is straight in a plan view (direction view along the vertical direction Z) to a curved section that is curved in a plan view, then the control unit 30 changes the traveling speed of the transport vehicle 1 such that the traveling speed of the transport vehicle 1 reaches a target speed at a target position on the downstream side X1 of the travel path 40 relative to the current position of the transport vehicle 1. When the traveling speed of the transport vehicle 1 is changed in this way, the control unit 30 generates reference speed commands in accordance with a traveling speed time change pattern such that the travel acceleration changes in a stepwise manner. The control unit 30 generates the reference speed command at a set time interval (each calculation cycle). Note that the traveling speed time change pattern is set such that the traveling speed of the transport vehicle 1 reaches the target speed at a target position on the downstream side X1 of the travel path 40 relative to the current position of the transport vehicle 1. As shown in FIG. 2, in the present embodiment, the control unit 30 includes a reference speed command generation unit 31 that generates the reference speed commands.

The control unit 30 generates a moving average command obtained using the moving average of the reference speed commands in a set period (moving average time), and controls travel operations of the travel units 10 based on the moving average command. The moving average command (speed command after moving average processing) is generated based on time series data of the reference speed commands in the set period. In the present embodiment, the moving average is a simple moving average that is not weighted, but the present invention is not limited to this, and a weighted moving average or the like may be used. As shown in FIG. 2, in the present embodiment, the control unit 30 includes a moving average command generation unit 32 that generates the moving average command, and the moving average command generation unit 32 generates the moving average command based on reference speed commands received from the reference speed command generation unit 31. Note that the reference speed command generation unit 31 and the moving average command generation unit 32 are at least logically separate from each other, and do not necessarily need to be physically separate.

The drive units M each include a motor unit that rotates the wheels 11 and an amplifier unit that drives the motor unit by feedback control so as to follow a drive command received from the control unit 30. The drive unit M rotates the wheels 11 such that the traveling speed of the transport vehicle 1 reaches a traveling speed that corresponds to the drive command received from the control unit 30. In the present embodiment, the control unit 30 or the drive unit M generates a position command based on the moving average command, and the amplifier unit of the drive unit M drives the motor unit of the drive unit M by position control that is performed based on the position command. The position command is generated by integrating moving average commands, for example. Note that the amplifier unit of the drive unit M may be configured to drive the motor unit of the drive unit M by speed control that is performed based on the moving average command.

Figure 3:
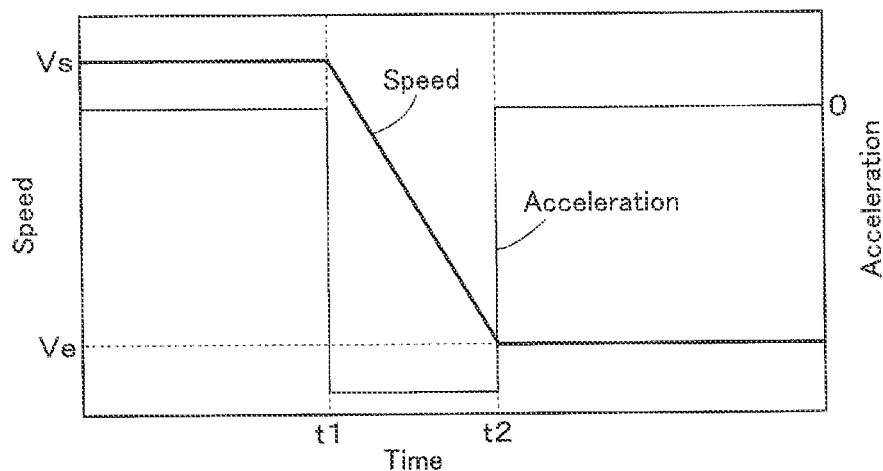
FIG. 3 is a diagram showing an example of a reference speed command.

FIG. 3 shows an example of a traveling speed time change pattern in which the travel acceleration changes in a stepwise manner (i.e., an example of a reference speed command). This traveling speed time change pattern is a pattern for causing the traveling speed of the transport vehicle 1 to reach a target speed (speed change end speed Ve) at a target position on the downstream side X1 of the travel path 40 relative to the current position of the transport vehicle 1. The target position here is the position of the transport vehicle 1 on the travel path 40 at a time t2. This traveling speed time change pattern is a pattern according to which the traveling speed of the transport vehicle 1, which is traveling at a constant speed (speed change start speed Vs), is changed (here, decreased) at a constant rate of change from the speed change start speed Vs to the speed change end speed Ve between the time t1 and the time t2. FIG. 3 shows the traveling speed and the travel acceleration, which is the rate of change (rate of change with respect to time) of the traveling speed, and in the traveling speed time change pattern shown in FIG. 3, the travel acceleration changes in a stepwise manner at the time t1 and the time t2.

Figure 4:
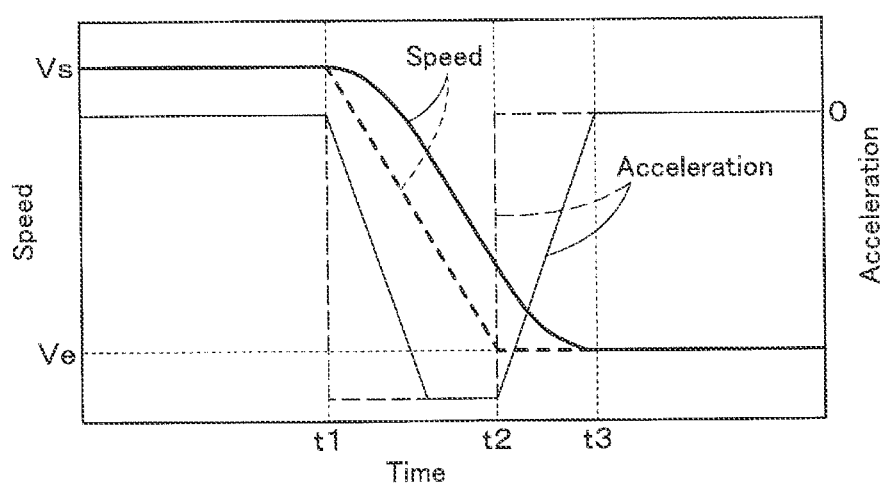
FIG. 4 is a diagram showing an example of a moving average command.

In FIG. 4, a solid line shows the moving average command (speed command after moving average processing) in the case where the traveling speed time change pattern used to generate the reference speed command is the pattern shown in FIG. 3, and the rate of change (the rate of change over time) of the moving average command is also shown by a solid line. Note that the two graphs shown in FIG. 3 are shown by dashed lines in FIG. 4. As is clear from FIG. 4, if travel operations of the travel unit 10 are controlled based on the moving average command (the speed command shown by the solid line in FIG. 4), the traveling speed of the transport vehicle 1 can be changed with a smoother change in the travel acceleration than in the case where travel operations of the travel unit 10 are controlled simply based on the reference speed command (the speed command shown by the dashed line in FIG. 4).

Note that in the example shown in FIG. 4, with the reference speed command (the speed command shown by the dashed line), the speed change end speed Ve is reached at the time t2, whereas with the moving average command (the speed command shown by the solid line), the speed change end speed Ve is reached at the time t3 that is after the time t2. For this reason, compared with the case where travel operations of the travel unit 10 are controlled simply based on the reference speed command, if travel operations of the travel unit 10 are controlled based on the moving average command, the traveling speed of the transport vehicle 1 reaches the speed change end speed Ve at a later time, and this delay (the time difference between the time t2 and the time t3) is equal to a set period (the moving average time).

Figure 5:
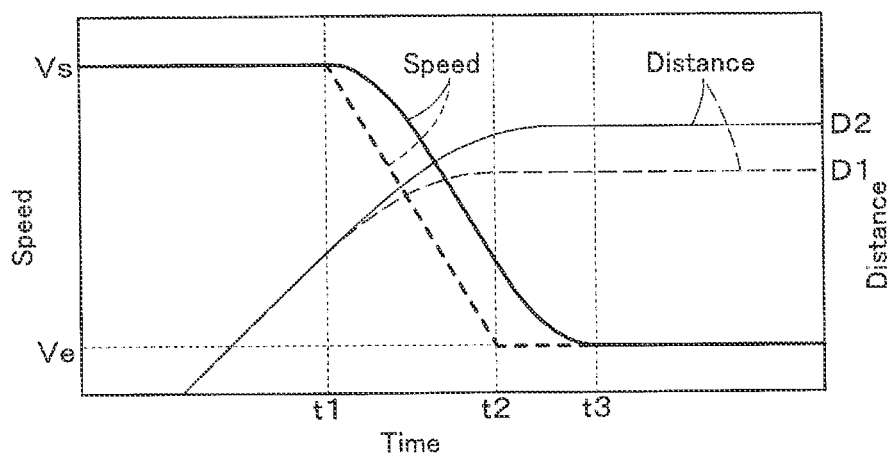
FIG. 5 is a diagram showing a difference in required stopping distance between a reference speed command and a moving average command.

Due to the existence of the above delay, in the case where travel operations of the travel unit 10 are controlled based on the moving average command as shown in FIG. 5, the distance that the transport vehicle 1 travels before the traveling speed of the transport vehicle 1 reaches the speed change end speed Ve is longer than in the case where travel operations of the travel unit 10 are controlled simply based on the reference speed command. Letting the set period (the moving average time) be T, the amount of increase in the travel distance is expressed as (Vs−Ve)×T/2. Note that FIG. 5 assumes the case where the speed change end speed Ve is zero (i.e., the case where the target speed is zero), solid lines in FIG. 5 show a graph of the moving average command shown in FIG. 4 and a graph of the travel distance of the transport vehicle 1 when travel operations of the travel unit 10 are controlled based on the moving average command, and dashed lines show a graph of the reference speed command shown in FIG. 3 and a graph of the travel distance of the transport vehicle 1 when travel operations of the travel unit 10 are controlled simply based on the reference speed command. It should also be noted that the graph of the travel distance of the transport vehicle 1 shows the travel distance along the travel path 40 (i.e., the position in the path lengthwise direction X) from the position that is the reference at each time point. As shown in FIG. 5, the required stopping distance (the travel distance required before the transport vehicle 1 stops) is a first distance D1 when travel operations of the travel unit 10 are controlled simply based on the reference speed command, whereas the required stopping distance is a second distance D2, which is longer than the first distance D1, when travel operations of the travel unit 10 are controlled based on the moving average command.

If the speed change end speed Ve is zero, letting T be the set period (the moving average time), the difference between the first distance D1 and the second distance D2 is expressed by Vs×T/2. Accordingly, if deceleration from the speed change start speed Vs is started at a position that is located the distance Vs×T/2 on the upstream side X2 compared with the case where travel operations of the travel unit 10 are controlled simply based on the reference speed command, or in other words, if deceleration from the speed change start speed Vs is started at a time that is T/2 earlier than in the case where travel operations of the travel unit 10 are controlled simply based on the reference speed command, the required stopping distance when travel operations of the travel unit 10 are controlled based on the moving average command can be equivalent to the required stopping distance when travel operations of the travel unit 10 are controlled simply based on the reference speed command.

Figure 6:
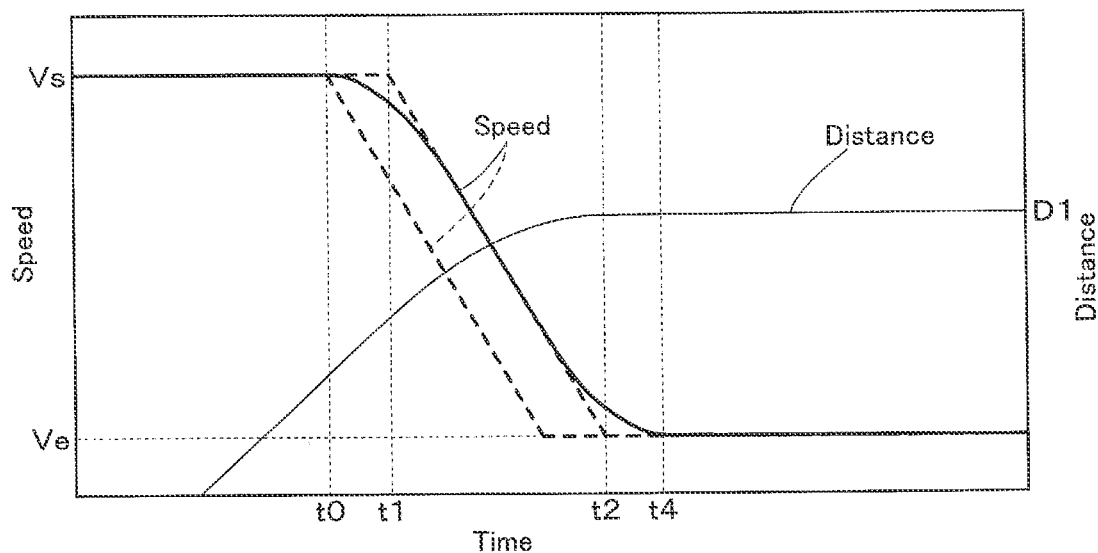
FIG. 6 is a diagram showing the required stopping distance in a case where the time specified in a traveling speed time change pattern is set earlier.

In FIG. 6, one solid line shows a graph of the moving average command in the case where the time specified in the traveling speed time change pattern used for generating the reference speed command is set earlier, by half the duration of the set period (the moving average time), than the case shown in FIG. 5, and another solid line shows a graph of the travel distance of the transport vehicle 1 when travel operations of the travel unit 10 are controlled based on the moving average command. In the example shown in FIG. 5, deceleration from the speed change start speed Vs is started at the time t1, whereas in the example shown in FIG. 6, as a result of the time specified in the traveling speed time change pattern being set earlier as described above, deceleration from the speed change start speed Vs is started at the time t0, which is earlier than the time t1 by half the duration of the set period. Accordingly, in FIG. 6, the required stopping distance when travel operations of the travel unit 10 are controlled based on the moving average command is the first distance D1, likewise to the required stopping distance when travel operations of the travel unit 10 are controlled simply based on the reference speed command in FIG. 5. Note that in FIG. 6, the moving average command reaches the speed change end speed Ve at the time t4, which is later than the time t2 by half the duration of the set period. Not only when the target speed is zero (i.e., when the transport vehicle 1 is to be stopped at the target position), but also when the traveling speed of the transport vehicle 1 is lowered to a target speed that is higher than zero, if the time specified in the traveling speed time change pattern used to generate the reference speed command is set earlier by a time that is set according to the set period (e.g., half the duration of the set period), the distance that the transport vehicle 1 travels before the traveling speed of the transport vehicle 1 reaches the target speed can be made closer to (e.g., the same as or equivalent to) the travel distance in the case where travel operations of the travel unit 10 are controlled simply based on the reference speed command.

In view of the above, it is preferable that the control unit 30 is configured such that the time specified in the traveling speed time change pattern is set earlier the longer the duration of the set period is, for example. In this case, the amount by which the time specified in the traveling speed time change pattern is set earlier than in the case where the time specified in the traveling speed time change pattern is not set earlier can be half the duration of the set period, similarly to the example shown in FIG. 6, for example.

Figure 7:
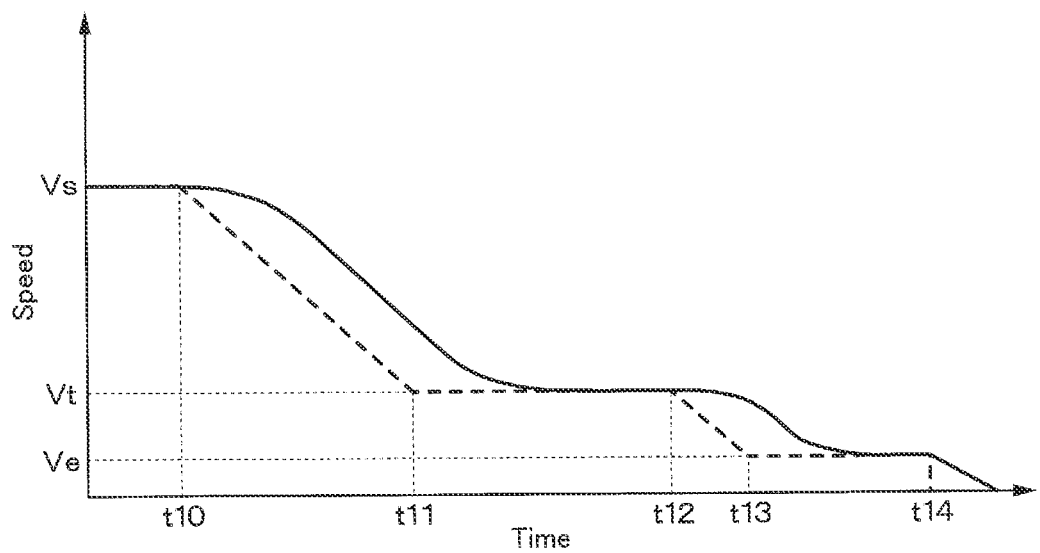
FIG. 7 is a diagram showing another example of the reference speed command and the moving average command.

Note that although the case where the traveling speed time change pattern is the pattern shown in FIG. 3 has been described here, of course any pattern can be adopted as the traveling speed time change pattern. FIG. 7 shows an example of a traveling speed time change pattern that is different from that in FIG. 3.

In FIG. 7, the traveling speed time change pattern is shown by a dashed line, and the moving average command generated based on the pattern is shown by a solid line. FIG. 7 shows a case where, unlike in FIG. 3, the traveling speed of the transport vehicle 1 is lowered in two steps from the speed change start speed Vs to the speed change end speed Ve. Specifically, the traveling speed time change pattern shown in FIG. 7 is a stepwise speed reduction pattern in which the traveling speed is lowered from the speed change start speed Vs to an intermediate speed Vt between the time t10 and the time t11, the traveling speed is maintained at the intermediate speed Vt between the time t11 and the time t12, the traveling speed is lowered from the intermediate speed Vt to the speed change end speed Ve between the time t12 and the time t13, the traveling speed is maintained at the speed change end speed Ve between the time t13 and the time t14, and then the traveling speed is lowered to zero at the time t14. The time t12 is, for example, the time when the transport vehicle 1 detects a detection target object (e.g., a strip-shaped member indicating a stop zone) provided on the upstream side X2 of a target stop position, and the time t14 is the time when the transport vehicle 1 detects a detection target object (e.g., a light reflector) provided at the target stop position. Even if the traveling speed time change pattern is the pattern shown in FIG. 7, by controlling travel operations of the travel units 10 based on the moving average command, the traveling speed of the transport vehicle 1 can be changed such that the change in the travel acceleration is smooth.

Note that the length of the optimum set period (moving average time) sometimes differs depending on the position of the transport vehicle 1 on the travel path 40, the travel condition of the transport vehicle 1, and the like. For example, when the transport vehicle 1 travels on a curved section of the travel path 40 that is curved in a plan view, it is sometimes preferable to reduce the length of the set period (including setting the length of the set period to zero, that is to say using the reference speed command as it is). However, if the length of the set period is simply changed, the moving average command becomes discontinuous before and after the change in the length of the set period, which may cause vibration to occur in the transport vehicle 1 and the article 2 transported by the transport vehicle 1. In view of this, in order to maintain the continuity of the moving average command before and after the change in the length of the set period, a configuration is preferable in which in the case where the control unit 30 changes the length of the set period, the changing of the length of the set period (including a change in which the length of the set period is set to zero) is performed while the transport vehicle 1 is traveling at a constant speed for a period longer than or equal to the length of the set period before the change. Note that the control unit 30 may be configured so as to not change the length of the set period while the transport vehicle 1 is traveling.

The embodiments disclosed in the present specification are merely examples in all respects, and various modifications can be made as appropriate without departing from the spirit of the present disclosure.

Overview of Above Embodiment

Hereinafter, an overview of the article transport facility described above will be described.

An article transport facility includes: a transport vehicle configured to travel along a travel path and transport an article; and a control unit configured to control a travel operation of a travel unit included in the transport vehicle, wherein in a case of changing a traveling speed of the transport vehicle, in order for the traveling speed of the transport vehicle to reach a target speed at a target position that is on a downstream side in the travel path relative to a current position of the transport vehicle, the control unit generates reference speed commands in accordance with a traveling speed time change pattern according to which travel acceleration changes in a stepwise manner, generates a moving average command obtained using a moving average of the reference speed commands in a set period, and controls the travel operation of the travel unit based on the moving average command.

In this configuration, when the traveling speed of the transport vehicle is changed toward the target speed, travel operations of the travel unit are controlled based on the moving average command obtained using the moving average of the reference speed commands. For this reason, the traveling speed of the transport vehicle can be changed such that the change in the travel acceleration is smoother than in the case where travel operations of the travel unit are controlled simply based on the reference speed command. Accordingly, when the traveling speed of the transport vehicle is changed, it is possible to reduce vibration that can occur in the transport vehicle and the article transported by the transport vehicle.

Note that in order to change the traveling speed of the transport vehicle such that the change in the travel acceleration is smooth, it is also conceivable to derive a traveling speed time change pattern that achieves a smooth change in the travel acceleration by performing calculation that gives consideration to jerk (the rate of change of the travel acceleration). However, with such a method, it can be difficult to respond to a case where the target speed changes. To address this, in the above configuration, it is possible to change the traveling speed of the transport vehicle such that the change of the travel acceleration is smooth while also using a traveling speed time change pattern according to which the travel acceleration changes in a stepwise manner, thus making it possible to also respond to a case where the target speed changes.

Here, it is preferable that the control unit is configured such that a time specified in the traveling speed time change pattern is set earlier the longer the set period is.

When travel operations of the travel unit are controlled based on the moving average command, the distance that the transport vehicle travels (required deceleration distance) before the traveling speed of the transport vehicle reaches the target speed during deceleration of the transport vehicle is longer than in the case where travel operations of the travel unit are controlled simply based on the reference speed command, and the length of the required deceleration distance increases as the length of the set period increases. In the case where the target speed is zero (i.e., the transport vehicle is to be stopped at the target position), the required deceleration distance is the distance that needs to be traveled before the transport vehicle can come to a stop (the required stopping distance). According to the above configuration, in consideration of this point, the time specified in the time change pattern can be set earlier the longer the set period is, and therefore the transport vehicle can decelerate to the target speed (e.g., be stopped) at the target position or in the vicinity thereof regardless of the length of the set period.

Also, it is preferable that in a case of changing the length of the set period, the control unit changes the length of the set period while the transport vehicle is traveling at a constant speed for a period longer than or equal to the set period before the change.

For example, when the transport vehicle travels on a curved section of a travel path that is curved in a plan view, it is sometimes preferable to reduce the length of the set period (including setting the length of the set period to zero, that is to say using the reference speed command as it is). According to this configuration, if the length of the optimum set period differs depending on the position of the transport vehicle on the travel path, the travel condition of the transport vehicle, or the like, the length of the set period can be changed while also maintaining the continuity of the moving average command before and after the change in the length of the set period. Accordingly, it is possible to suppress vibration of the transport vehicle and the article transported by the transport vehicle when the length of the set period is changed.

The article transport facility according to the present disclosure need only be capable of exhibiting at least one of the above-described effects.

What is claimed is:

1. An article transport facility comprising:
a transport vehicle comprising at least one travel unit, the transport vehicle being configured to travel along a travel path and transport an article; and
a control unit included in the transport vehicle and configured to control a travel operation of the at least one travel unit,
wherein, in a case of changing a traveling speed of the transport vehicle, in order for the traveling speed of the transport vehicle to reach a target speed at a target position that is on a downstream side in the travel path relative to a current position of the transport vehicle, the control unit generates reference speed commands in accordance with a traveling speed time change pattern according to which travel acceleration changes in a stepwise manner, generates a moving average command obtained using a moving average of the reference speed commands in a set period, and controls the travel operation of the at least one travel unit based on the moving average command, and
wherein the control unit changes the traveling speed of the transport vehicle in accordance with the traveling speed time change pattern earlier as the set period is longer.

2. The article transport facility according to claim 1, wherein, in a case of changing a length of the set period, the control unit changes the length of the set period while the transport vehicle is traveling at a constant speed for a period longer than or equal to the length of the set period before the change.

3. The article transport facility according to claim 1, wherein the control unit changes a length of the set period so that the length of the set period is a value larger than zero in accordance with a shape of the travel path.

4. The article transport facility according to claim 1, wherein the control unit reduces a length of the set period to a value larger than zero in a case where the transport vehicle travels along a curved section of the travel path as compared to a case where the transport vehicle travels along a straight section of the travel path.

* * * * *